2,829,163
OXIDATION PROCESS FOR OBTAINING CYCLOHEXANONE OXIME

George G. Joris, Madison, and John Vitrone, Jr., West Paterson, N. J., assignors to Allied Chemical & Dye Corporation, New York, N. Y., a corporation of New York No Drawing. Application October 18, 1954
Serial No. 463,054

9 Claims. (Cl. 260—566)

This invention relates to conversion of N-cyclohexylhydroxylamine to cylohexanone oxime by direct oxidation in liquid phase with elemental oxygen, e. g. elemental oxygen present in a gas such as air.

The oxidation process of this invention is carried out upon N-cyclohexylhydroxylamine in aqueous acid solution. Suitable solutions can be obtained directly by reducing nitrocyclohexane admixed with aqueous acid, so that the present invention comprises a process for converting nitrocyclohexane to N-cyclohexylhydroxylamine by reduction, followed by oxidation of the reduction product to cyclohexanone oxime.

N-cyclohexylhydroxylamine has the structural formula $(CH_2)_5$>CHNHOH. Its melting point has been given as 130–131° C. in the literature; according to our data it is 140–141° C.

Our process comprises intimately contacting N-cyclohexylhydroxylamine dissolved in an aqueous relatively weak acid, as defined below, with elemental oxygen in presence of cupric copper dissolved in said aqueous acid; and maintaining said contact until substantial quantities of oxygen have been absorbed by the reaction mixture.

The acid used in our process is relatively weak, i. e. it has a dissociation constant in water between about $1 \times 10^{-6}$ and $2 \times 10^{-1}$. Moreover the acid must be capable of dissolving cupric copper in an aqueous solution i. e. its cupric salt must be soluble in an aqueous solution of the acid. Typical of suitable acids are acetic, propionic and oxalic acids.

In addition to the aqueous acid we preferably maintain present an organic solvent of cyclohexanone oxime immiscible with the aqueous phase. This solvent will extract oxime, removing it from the acidic medium in which by-product formation otherwise tends to take place. Suitable immiscible solvents are cyclohexane, chloroform, benzene, petroleum ether and non-polar organic solvents generally.

Concentrations of cyclohexylhydroxylamine initially employed usually are in the range from about 1 gram to about 50 grams of N-cyclohexylhydroxylamine per 100 cc. of aqueous acid.

Intimate contact of the N-cyclohexylhydroxylamine in liquid phase with elemental oxygen is suitably affected by bubbling oxygen, or a gas containing oxygen such as air, through the N-cyclohexylhydroxylamine or solution thereof; by agitating the liquid with such a gas; by passing the liquid and gas through a packed vessel, e. g. in countercurrent flow; or by a combination of these or other expedients.

Temperatures employed in our process can be as low as about 0° C. and up to the boiling point of the reaction mixture at the operating pressure. The optimum temperature will depend upon factors including the particular acid employed; the contact time in the reaction zone; the total pressure and oxygen partial pressure in the reaction zone; the specific cupric catalyst employed and its concentration; etc. Optimum temperatures under preferred conditions outlined herein are in the range between about 35° and about 50° C.

For economy and convenience, total pressures employed are preferably about atmospheric but superatmospheric and subatmospheric pressures can be used if desired. On the same grounds elemental oxygen preferably employed is oxygen of air, but other gases containing elemental oxygen, and pure elemental oxygen, can be used if desired.

We have found that presence of cupric copper dissolved in the aqueous acid is essential in our process. The copper can be introduced in any form convertible to dissolved cupric copper, e. g. in metallic or in oxide form. When the preferred acetic acid aqueous medium is used, cupric acetate and the copper-containing oxidation by-product of our process, separable by distillation as a residue, are specially good catalysts. Quantities of copper employed are in the typical range of catalytic quantities, e. g. about 0.01%–10% of copper based on the N-cyclohexylhydroxylamine reactant introduced. Larger quantities can be used if desired.

The following example is illustrative of our invention, but our invention is not limited to the precise details of the example. Parts stated are parts by weight unless otherwise shown.

*Example.*—The N-cyclohexylhydroxylamine reactant was obtained by hydrogenating nitrocyclohexane admixed in equimolar amount with acetic acid dissolved at 10% concentration in water, and using hydrogen over a 5% palladium on alumina catalyst and 20° C. temperature. Pressures were in the range of 1–5 atmospheres. The small amounts of impurities in the product were chiefly nitrocyclohexane and cyclohexyl amine.

141 parts by volume of the resulting 10% aqueous acetic acid containing dissolved therein 82 grams of N-cyclohexylhydroxylamine per liter was mixed with 50 parts by volume of cyclohexane. Cupric acetate monohydrate was added as catalyst in the amount of 1 part per 11.5 parts by weight of cyclohexylhydroxylamine reactant introduced; i. e. in the amount of about 3% of copper based on the amount of cyclohexylhydroxylamine reactant introduced.

Oxygen was absorbed upon stirring the mixture with a stream of oxygen at 45° C. for 30 minutes. Air can be used with like results; propionic or oxalic acid can be substituted for acetic acid; and chloroform can be substituted for cyclohexane, all with like results.

70% of the cyclohexylhydroxylamine was consumed as shown by analysis of the cyclohexylhydroxylamine remaining in the aqueous acid layer.

Analysis of the cyclohexane layer showed 66% of the theoretical yield of cyclohexanone oxime on the basis of the amount of cyclohexylhydroxylamine reactant introduced, and 94% of theory yield on the basis of cyclohexylhydroxylamine consumed. The oxime can be recovered by crystallizing it from the cyclohexane solvent; by distillation of the cyclohexane layer; etc.

We have found that the aqueous acid layer, which can contain unoxidized cyclohexylhydroxylamine, can be recycled suitably after removal of its copper content. Specifically, flash distillation leaves a copper containing oxidation by-product as a residue. This residue comprising the copper-containing by-product was used as catalyst in subsequent operations, unreacted cyclohexylhydroxylamine therein being thus recycled to the oxidation step. The distillate, containing some of the unreacted cyclohexylhydroxylamine, was recycled to the hydrogenation step and supplied aqueous acetic acid therein.

We have found that palladium on alumina catalyst is very efficient in hydrogenating nitrocyclohexane admixed with aqueous relatively weak acid and thus forming a solution of N-cyclohexylhydroxylamine in said aqueous acid suitable for oxidation in accordance with our invention.

Other catalysts can also be used for the desired hydrogenation, e. g. supported platinum or nickel catalysts; active catalysts partially poisoned with a sulfur compound such as 10% palladium on charcoal partially poisoned with thiophene; etc. Reducing conditions which produce cyclohexanone oxime together with N-cyclohexylhydroxylamine can be used for our purposes since the aqueous relatively weak acids employed in our process, such as 10% aqueous acetic acid, do not hydrolyze cyclohexanone oxime appreciably under the conditions necessary for such reduction nor under our oxidation conditions.

We claim:

1. Process for oxidizing N-cyclohexylhydroxylamine to cyclohexanone oxime which comprises intimately contacting N-cyclohexylhydroxylamine, dissolved in an aqueous acid having dissociation constant in water between about $1 \times 10^{-6}$ and about $2 \times 10^{-1}$, with elemental oxygen in presence of cupric copper dissolved in said aqueous acid; and maintaining said contact until substantial quantities of oxygen have been absorbed by the reaction mixture.

2. Process as defined in claim 1 wherein an organic solvent of cyclohexanone oxime, immiscible with the aqueous acid phase, is maintained present.

3. Process as defined in claim 2 wherein the elemental oxygen is supplied in the form of oxygen of air.

4. Process as defined in claim 3 wherein the acid is acetic acid, the immiscible solvent is cyclohexane, cupric acetate is employed to provide the cupric copper, and temperatures are in the range between about 35° C. and about 50° C.

5. A process for conversion of nitrocyclohexane to cyclohexanone oxime, comprising the steps of reducing nitrocyclohexane, admixed with aqueous acid having dissociation constant in water between about $1 \times 10^{-6}$ and about $2 \times 10^{-1}$, to N-cyclohexylhydroxylamine dissolved in said aqueous acid; and intimately contacting said dissolved cyclohexylhydroxylamine, in presence of cupric copper dissolved in said aqueous acid, with elemental oxygen until substantial quantities of oxygen have been absorbed by the reaction mixture.

6. Process as defined in claim 5 wherein the reduction is effected by catalytic hydrogenation over a palladium-on-alumina catalyst, the acid is acetic acid and an organic solvent of cyclohexanone oxime, immiscible with aqueous acetic acid, is present during the oxidation step.

7. Process as defined in claim 6 wherein the oxidation product is separated into an organic solvent layer and an aqueous acid layer and the aqueous acid layer is distilled; the resulting distillate is recycled to the reduction step; and the distillation residue is recycled to the oxidation step to provide at least part of the copper used subsequently therein.

8. A process for the oxidation of cyclohexylhydroxylamine to cyclohexanone oxime which comprises contacting with elemental oxygen a reaction mixture consisting essentially of an aqueous solution of a weak acid salt of N-cyclohexylhydroxylamine, copper in cupric state dissolved in said aqueous solution as a catalyst, and an extraction solvent for cyclohexanone oxime product which solvent is immiscible with the aqueous phase; and maintaining said contact until a substantial quantity of oxygen has been absorbed by said reaction mixture.

9. Process as defined in claim 8 wherein said extraction solvent for cyclohexanone oxime product is cyclohexane.

References Cited in the file of this patent

Wallach et al.: "Liebigs Annalen," vol. 279 (1894), pp. 367–69.

Harries et al.: "Ber. deut. Chem.," vol. 31 (1898), pp. 1810–11.

Harries et al.: "Ber. deut. Chem.," vol. 31 (1898), pp. 1379–83.

Harries et al.: "Ber. deut. Chem.," vol. 32 (1899), pp. 1348–49.

Grammaticakis: "Comptes Rendus," vol. 224 (1947), pp. 1066–68.